United States Patent
Gabel

(10) Patent No.: US 9,021,850 B2
(45) Date of Patent: May 5, 2015

(54) CHAMFER CUTTING DEVICE

(75) Inventor: Mark R. Gabel, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 450 days.

(21) Appl. No.: 13/380,640

(22) PCT Filed: Jun. 25, 2010

(86) PCT No.: PCT/US2010/039960
§ 371 (c)(1),
(2), (4) Date: Dec. 23, 2011

(87) PCT Pub. No.: WO2011/002681
PCT Pub. Date: Jan. 6, 2011

(65) Prior Publication Data
US 2012/0097696 A1  Apr. 26, 2012

Related U.S. Application Data

(60) Provisional application No. 61/222,323, filed on Jul. 1, 2009.

(51) Int. Cl.
*B21D 31/02* (2006.01)
*B23D 15/00* (2006.01)
(Continued)

(52) U.S. Cl.
CPC .............. *B23D 15/00* (2013.01); *B21D 19/005* (2013.01); *B26D 1/06* (2013.01); *B26D 3/02* (2013.01); *B26D 3/06* (2013.01); *B26D 7/26* (2013.01); *B26D 2007/0093* (2013.01)

(58) Field of Classification Search
CPC .............. B26D 3/00; B26D 3/08; B26D 3/02; B26D 1/06; B26D 7/26; B26D 7/01; B26D 7/02; B26D 11/00; B26D 5/10; B65H 49/00; G01M 1/16; B31B 1/25; B31B 2201/25
USPC .................. 72/325, 326, 327, 332, 333, 338; 29/557; 83/148, 111, 129, 134–142; 242/562; 73/468, 458
See application file for complete search history.

(56) References Cited

U.S. PATENT DOCUMENTS 824,007 A * 6/1906 Gordon ........................... 72/325
2,852,969 A * 9/1958 Piha et al. ..................... 408/186
(Continued)

FOREIGN PATENT DOCUMENTS

JP       07 124682       5/1995
JP       2000 024719 A   1/2000
(Continued)

OTHER PUBLICATIONS

PCT International Search Report, PCT/US2010/039960 dated Jan. 18, 2011, 3 pages.

*Primary Examiner* — Shelley Self
*Assistant Examiner* — Gregory Swiatocha
(74) *Attorney, Agent, or Firm* — Dena M. Ehrich

(57) ABSTRACT

Chamfer cutting devices are described. The chamfer cutting devices include a mounting bracket, an electromagnet rigidly attached to the mounting bracket, a hold/release arm magnetically coupled to the electromagnet, a chamfer former rigidly attached to the hold/release arm, wherein the chamfer cutter comprises two bending beams, each terminating in a chamfer point, and a blade rigidly connected to the mounting bracket and positioned between the chamfer points. Dispensers incorporating such chamfer cutting devices and methods of chamfer cutting are also described.

4 Claims, 4 Drawing Sheets

(51) Int. Cl.
  *B21D 19/00* (2006.01)
  *B26D 3/02* (2006.01)
  *B26D 3/06* (2006.01)
  *B26D 7/26* (2006.01)
  *B26D 7/00* (2006.01)
  *B26D 1/06* (2006.01)

(56) References Cited

U.S. PATENT DOCUMENTS

| | | | | |
|---|---|---|---|---|
| 4,545,440 A | * | 10/1985 | Treadway | 173/132 |
| 4,882,924 A | | 11/1989 | Kohama | |
| 5,235,881 A | * | 8/1993 | Sano et al. | 83/55 |
| 5,607,439 A | * | 3/1997 | Yoon | 606/185 |
| 5,666,840 A | * | 9/1997 | Shah et al. | 72/55 |
| 5,718,142 A | * | 2/1998 | Ferraro | 72/326 |
| 5,722,139 A | * | 3/1998 | Ladouceur et al. | 29/34 R |
| 6,616,089 B2 | * | 9/2003 | Gross et al. | 242/562 |
| 2007/0122245 A1 | | 5/2007 | Yanagimoto | |
| 2010/0319512 A1 | * | 12/2010 | Otsuka | 83/578 |

FOREIGN PATENT DOCUMENTS

JP 2006 205269 A 8/2006
KR 20 1999 0006593 2/1999

* cited by examiner

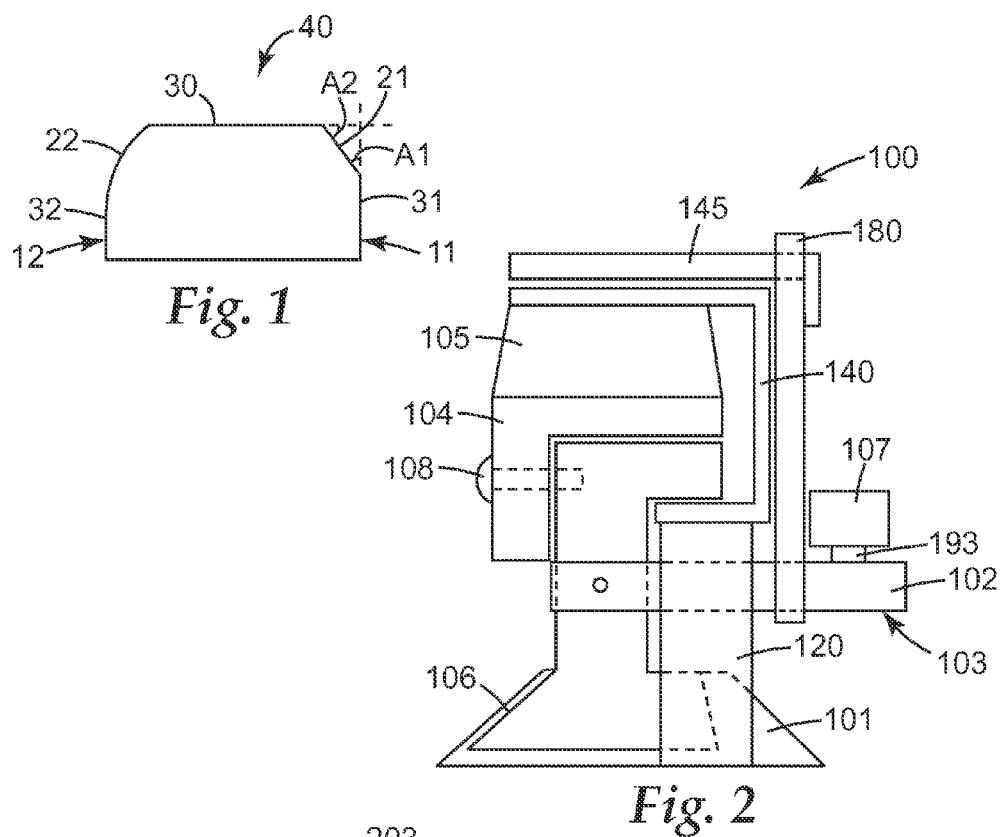
Fig. 1
Fig. 2
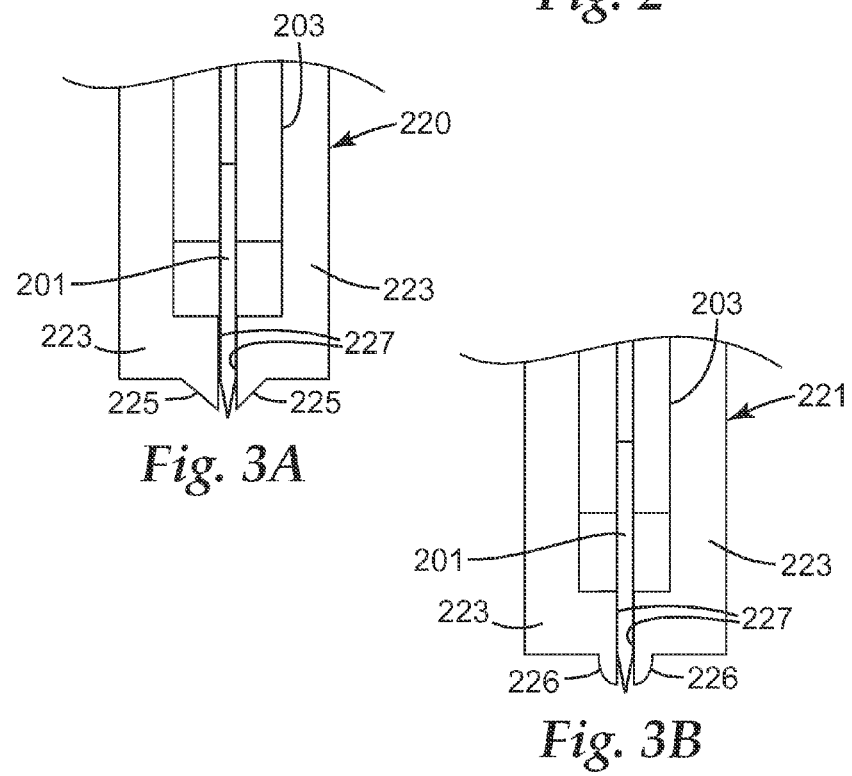
Fig. 3A
Fig. 3B

CHAMFER CUTTING DEVICE

CROSS REFERENCE TO RELATED APPLICATIONS

This application is a national stage filing under 35 U.S.C. 371 of PCT/US2010/039960, filed Jun. 25, 2010, which claims priority to U.S. Provisional Application No. 61/222,323, filed Jul. 1, 2009, the disclosure of which is incorporated by reference in its/their entirety herein.

FIELD

The present disclosure relates to a device for creating a chamfered edge on the cut end of a material as it is being cut. Methods of creating a chamfered edge while cutting the material are also disclosed.

BACKGROUND

There are many applications where it is desirable to have access to numerous parts, each comprised of the same materials and having the same dimensions. There are also many applications where it is desirable to have access to numerous parts, each comprised of the same materials but having different sizes or shapes. In either case, one common approach is to have a supply of pre-cut parts; however, in some applications, it may be more efficient to have a continuous supply (e.g., a roll) of the material and cut individual parts from the roll as needed. This is particularly advantageous in applications where the size of the desired part is determined just prior to its application, and/or when there is a continuous distribution of desired sizes rather than a discrete number of part sizes.

In some applications, the precise dimensions of a cut part may be critical. For example, a lead-free wheel weight system is available from 3M Company (St. Paul, Minn.), which combines a lead-free wheel balancing material with an adhesive tape. The wheel weight system is available in rolls of various lengths, widths, and heights. Based on the particular density, width, and height of the material, parts having a desired weight can be produced by cutting a precise length from the roll stock. In some applications, e.g., wheel balancing, the length of the part (i.e., the lead-free wheel weight system) is determined shortly before the part is needed for assembly.

In many cut and dispense applications, a straight cut across the width and through height of the material is adequate. However, with thicker materials intended to be applied by hand the shape of the cut-edge may affect the ergonomics of the product and its intended use. For example, the repeated hand application of parts having sharp corners or edges may result in discomfort as a finger or thumb is pressed on or slid over the edge as the cut part is pressed into place.

The creation of a chamfered edge of a part to create a desired edge profile is known. As illustrated in FIG. 1, first chamfered corner 21 is the profiled portion of first cut edge 11 connecting top surface 30 and first cut side wall 31 of part 40. In some embodiments, second chamfered corner 22 forms part of second cut edge 12, and again connects to both top surface 30 and second cut side wall 32.

As used herein, a "chamfered corner" includes beveled corners and rounded corners. First chamfer 21 illustrates a beveled corner, i.e., a substantially planar corner intersecting the top surface and the cut side wall at angles other than 90 degrees. The term "substantially planar" is meant to encompass the normal variations typical in any manufacturing process including, e.g., some rounding at the intersection of the beveled corner and the top surface and at the intersection of the beveled corner and the side wall.

Referring to FIG. 1, the angle between the beveled corner and the cut side wall, A1, and the angle between the beveled corner and the top surface, A2, sum to 90 degrees. In some embodiments, angle A1 is at least 10 degrees, e.g., at least 20 degrees, or even at least 30 degrees. In some embodiments, angle A1 is no greater than 80 degrees, e.g., no greater than 70 degrees, or even no greater than 60 degrees. In some embodiments, angle A1 is between 30 and 60 degrees, inclusive, e.g., between 40 and 50 degrees, inclusive.

Second chamfered corner 22 illustrates a rounded corner. As used herein, a "rounded corner" consists essentially of a continuous, arcuate corner connecting the top surface to the cut side wall. The rounded corner may be convex or concave. The term "consists essentially of a continuous, arcuate corner" is meant to encompass the normal variations typical in any manufacturing process, particularly variations that can occur at the intersection of the chamfered edge and one or both of the top surface and the cut side edge.

Often, a chamfered corner is formed after a part is cut. Commonly, the chamfered is formed by removing (e.g., cutting or abrading) material near the intersection of the top surface and the cut edge until the desired profile is obtained. However, in rare applications (e.g., the creation of precision wheel weight segments) the removal of material would result in an undesirable decrease in the mass of the part. This problem could be overcome by molding parts with the desired profile; however, such an approach is not practical for on-demand application or applications requiring a continuous distribution of part sizes.

Therefore, it some applications, it may be desirable to provide a device capable of cutting a part to a desired length and creating a chamfered edge in the same step. It may also be desirable to create the chamfered edge without removing material.

SUMMARY

Briefly, in one aspect, the present disclosure provides a chamfer cutting device. In some embodiments, the chamfer cutting device comprises a mounting bracket, an electromagnet rigidly attached to the mounting bracket, a hold/release arm magnetically coupled to the electromagnet, a chamfer former rigidly attached to the hold/release arm. Generally, the chamfer cutter comprises two bending beams, each terminating in a chamfer point. The chamfer cutting device also includes a blade rigidly connected to the mounting bracket and positioned between the chamfer points.

In some embodiments, the mounting bracket comprises an actuator arm, an electromagnet support, and a blade holder. One end of the actuator arm is rigidly connected to the blade holder and the other end of the actuator arm is rigidly connected to an actuator. An electromagnet is rigidly connected to the electromagnet support, which is rigidly connected to the blade holder.

In some embodiments, the chamfer former further comprises two lobes, one lobe extending from each bending beam away from the chamfer points.

In another aspect, the present disclosure provides a dispenser comprising a frame having a base and a wall, and a chamfer cutting device mounted to the frame. In some embodiments, the frame further comprises a pair of side guides positioned below the blade of the cutting device and a pair of hard stops attached to the tops of the side guides suspended above the base creating a path for material to pass below the hard stops and between the side guides.

The above summary of the present disclosure is not intended to describe each embodiment of the present invention. The details of one or more embodiments of the invention are also set forth in the description below. Other features, objects, and advantages of the invention will be apparent from the description and from the claims.

BRIEF DESCRIPTION OF THE DRAWINGS

FIG. 1 illustrates a part having chamfered corners.

FIG. 2 illustrates one exemplary cutting device according to some embodiments of the present invention.

FIG. 3A is a side view of exemplary chamfer former according to some embodiments of the present invention.

FIG. 3B is a side view of another exemplary chamfer former according to some embodiments of the present invention.

DETAILED DESCRIPTION

Figure 4A:
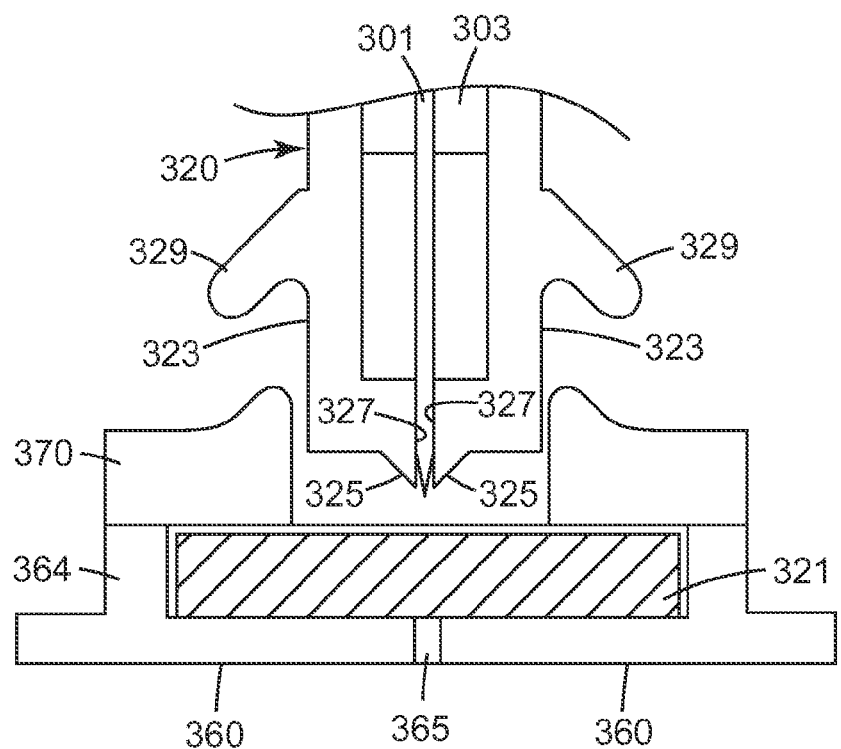
FIG. 4A is a side view of a chamfer former according to some embodiments of the present invention prior to cutting and chamfering the material.

3M Company supplies a lead free wheel weight system to the automotive market. In some cases, the lead free wheel weight system is provided in the form or pre-cut parts of a specified weight. In other cases, the system is provided in roll form and a dispenser is interfaced directly to the customer wheel balancer. The dispenser cuts the exact weights needed for balancing the tire. One such commercially available dispenser is the 3M TN276 dispenser (3M Company, St. Paul, Minn.).

The cut weights are generally applied by hand to the wheel being balanced at a typical application rate of one part every 5-6 seconds. In some cases, the repetitive application of parts having a sharp edge or corner can lead to discomfort as, e.g., a finger or thumb presses on or slides over the corner as the part is pressed into place.

The present inventor developed a cutting device capable of cutting precise length parts while creating a chamfered corner. The chamfered corner is created during the cutting operation and therefore does not require a separate time-consuming and costly step. In addition, the chamfer is created with little to no loss of material; thus the need to provide precise weight parts is not sacrificed and waste is minimized.

An exemplary cutting device according to some embodiments of the present disclosure is shown in FIG. 2. Cutting device 100 includes blade 101, which cuts through the material to provide the desired part length. Generally, any commercially available blade including, e.g., razor blades, utility knife blades, and the like may be used.

A portion of blade 101 is covered by bending beam chamfer former 120. Chamfer former 120 is mechanically connected to hold/release arm 140. The top portion of hold/release arm 140 extends over the top of electromagnet 105. During operation, hold/release arm 140 can be magnetically coupled to electromagnet 105. Generally the electromagnet is connected to controllable power source. Known methods may be used to control the magnitude of the magnetic force coupling hold/release arm to electromagnet 105, including, e.g., the current through the electromagnet and the distance between the electromagnet and the hold/release arm.

Mounting bracket 103 comprises actuator arm 102, electromagnet support 104, and blade holder 106. One end of actuator arm 102 is rigidly connected to blade holder 106 and the other end is connected to actuator 107 via actuator drive arm 193. Electromagnet 105 rigidly connected to electromagnet support 104, which is rigidly connected to blade holder 106 via, e.g., bolt 108. Blade 101 is then held in place by blade holder 106.

Methods of rigidly attaching or connecting parts include, e.g., the use of adhesives, mechanical fasteners, welds, and the like.

Actuator 107 provides the force required to drive mounting bracket 103 down like a piston. Generally, any known actuator may be used. In some embodiments, a pneumatic actuator is used and gas pressure, e.g., air pressure, is used to drive the mounting bracket downward. In some embodiments, a hydraulic actuator may be used. In some embodiments, a solenoid actuator may be used. The actuator is rigidly attached to a support, e.g., a frame illustrated as wall 180 in FIG. 2. When activated, actuator 107 forces actuator drive arm 193 downward. At the end of a half-cycle, actuator 107 retracts actuator drive arm 193 back toward actuator 107.

During a cutting operation, the actuator is activated, either manually or automatically, e.g., according to some preset program. When activated, the actuator, via the actuator drive arm, drives the entire mounting bracket downward. Being mechanically coupled to mounting bracket, the blade and the electromagnet are also driven downward. As the hold/release arm is magnetically coupled to the electromagnet, it too descends as the mounting bracket is driven downward carrying the chamfer former with it.

When the chamfer former encounters the top surface of the material to be cut, it is pressed into and begins to deform the material. At this point, the motion of the blade and the chamfer former are linked to the motion of the mounting bracket; thus, they descend at the same speed and the blade begins cutting the material.

As the mounting bracket continues to descend, the force to press the chamfer former into the material increases until it exceeds the magnetic force coupling the hold/release arm to the electromagnet. At this point, the hold/release arm releases from the electromagnet and the chamfer former is no longer carried downward as the actuator continues to drive the mounting bracket downward. The continued downward motion of the mounting bracket allows the blade to complete the cut through the material.

At the completion of the downward portion of a cut cycle, the actuator is used to retract the mounting bracket upward, carrying the blade, the electromagnet, the hold/release arm, and the chamfer former back to their starting positions. As it is carried upward, hold/release arm 140 has its motion stopped by reset arm 145 (which may be a part of or attached to a frame) and hold/release arm 140 is pressed firmly back into position where it is once again magnetically coupled to the top of electromagnet 105. This completes one cut cycle of the cutting device.

FIG. 3a illustrates an exemplary chamfer former according to some embodiments of the present disclosure. Chamfer former 220 includes bending beams 223 and chamfer points 225. Blade 201 is connected to mounting bracket 203 and is positioned between opposing faces 227 of chamfer points 225. Blade 201 shown with its tip parallel to the tip of chamfer points 225. However, the position of blade 201 may adjusted such that it extends from or is recessed from the tips of chamfer points 225.

Another exemplary chamfer former 221 is shown in FIG. 3b. Chamfer former 221 is identical to chamfer former 220 of FIG. 3a, except that chamfer points 226 have a different profile as compared to chamfer points 225.

Although the chamfer formers illustrated in FIGS. 3a and 3b are suitable for some applications, the present inventor identified several disadvantageous with these designs. First, as the chamfer points are pressed into the material, they are restricted from bending outward away from the blade. In fact, in some applications they may be bent inward and pressed against the blade. The friction created between the blade and the opposing faces of the chamfer points may be so great that that the force available from the activator may not be enough to continue driving the blade down through the material. This problem might be reduced by leaving a gap between the blade and the opposing faces of the chamfer points. However, the present inventor discovered that such a gap can result in material being pressed upward into this gap as the chamfer former is pressed downward. This can result in an undesirable ridge along the cut edge. This gap can also lead to the undesirable removal of material from the cut part, altering the mass of the finished part and creating debris.

A second disadvantage is that the force to such press chamfer formers into a material depends on the mechanical properties (e.g., the compression modulus) of the material. This can lead to variations in the depth at which the force required to drive the chamfer former into the material exceeds the magnetic force coupling the hold/release arm to the electromagnet. This can result in undesirable variability in the dimensions of the chamfered corner.

Figure 4B:
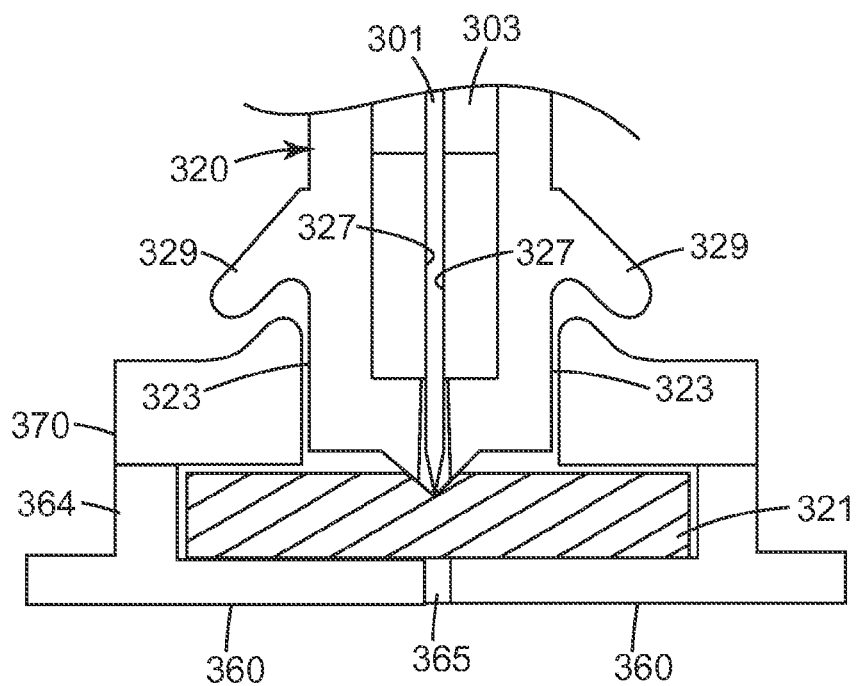
FIG. 4B is a side view of a chamfer former according to some embodiments of the present invention as it begins to cut and chamfer the material.
Figure 4C:
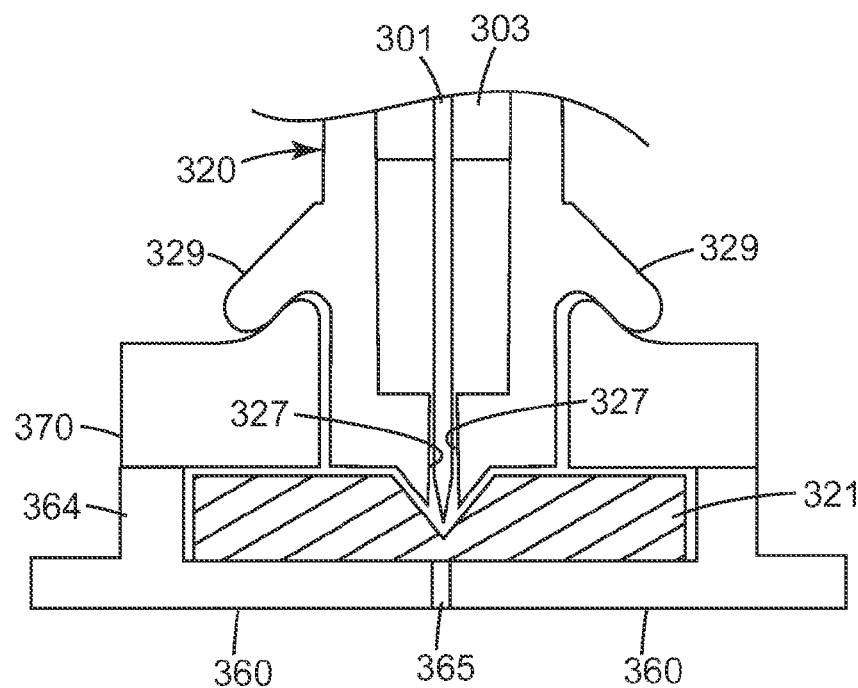
FIG. 4C is a side view of a chamfer former according to some embodiments of the present invention as it continues to cut and chamfer the material, and its lobes encounter the hard stops.

An alternative exemplary chamfer former according to some embodiments of the present disclosure is shown in FIGS. 4a-4c. Chamfer former 320 includes bending beams 323 and chamfer points 325. Chamfer former 320 also includes lobes 329 extending from the side of bending beams 323 opposite chamfer points 325. Blade 301 is connected to mounting bracket 303 and is positioned between opposing faces 327 of chamfer points 325. As discussed below, although a gap can be created between the opposing faces and the blade, the opposing faces may also be positioned to minimize or even eliminate any gap; thus, reducing or eliminating the problems associated with material being squeezed into the gap during operation.

Material 320 is also shown in FIGS. 4a-4c. Material 321 is supported by base 360 of the cutting device. Side guides 364 may be integral with or attached to the top surface of base 360. Side guides restrict the motion of material 320 such that it follows a desired path below the chamfer cutter. Hard stops 370 are mounted to side guides 364 and positioned above base 360 such that material 320 can pass below them.

As shown in FIG. 4a, as mounting bracket 303 is driven downward, chamfer former 320 and blade 301 pass between hard stops 370. Referring to FIG. 4b, as mounting bracket 303 continues to descend; chamfer former 320 is pressed into material 321 and begins to form a chamfered corner. Referring to FIG. 4c, as chamfer former 320 continues pressing into material 321, lobes 329 contact hard stops 370, and their interaction causes bending beams 323 to begin opening. Freeing blade 301 from any frictional force resulting from contact with opposing faces 327.

Figure 4D:
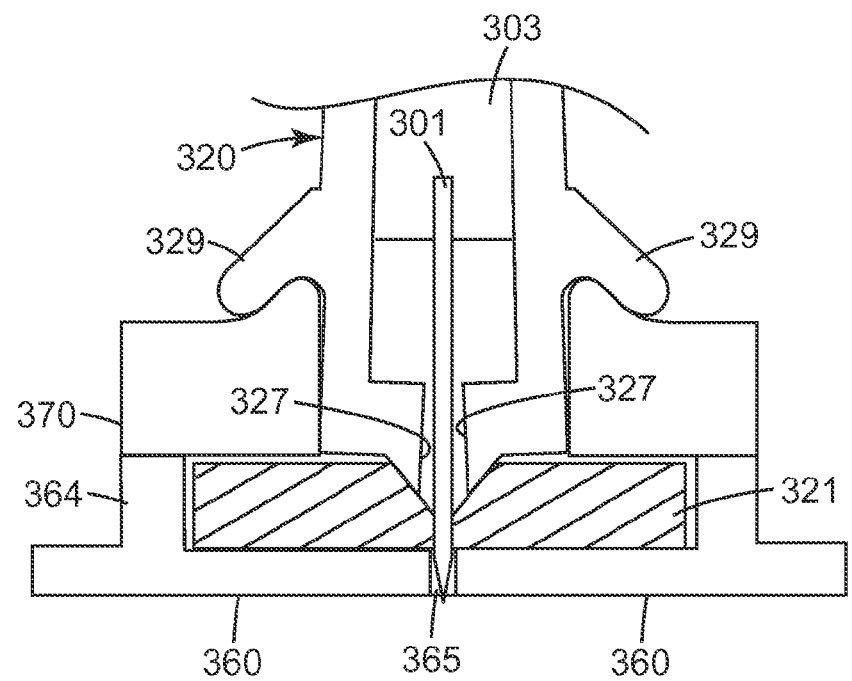
FIG. 4D is a side view of a chamfer former according to some embodiments of the present invention as it completes cutting and chamfering the material.

Finally, as shown in FIG. 4d, when lobes 329 are fully seated upon hard stops 370, the force required to continue driving chamfer former 320 downward will rise and rapidly exceed the magnetic force retaining the hold/release arm to the electromagnet. Thus, by simply positioning the hard stops relative to the base supporting the material, the depth of the chamfered edge can be controlled independent of the mechanical properties of the material being cut. As also shown in FIG. 4d, once the hold/release arm become decoupled from the electromagnet, blade 301 is free to move independent from chamfer former 320 and can finish the cut through material 321, passing into groove 365 below.

Generally, the materials used to construct the various parts of the cutting devices of the present disclosure are not critical, and may be selected according to routine design considerations such as weight, cost, strength and durability. However, additional factors must be considered in the material selections for the chamfer former.

With respect to the chamfer points, the material should be selected to resist erosion or abrasion relative to the materials intended to be cut. In addition, the chamfer points should be constructed of a material mechanical strength to resist deformation over a large number of repeated cuts. Other factors may include coefficient of friction relative to the materials being cut, and chemical compatibility with such materials.

With respect to the bending beams, the length and thickness of the beams and the elastic modulus of their material of construction should be selected to give the desired beam bending force as the beams are bent away from the blade when the lobes encounter the hard stops. The bending beams should also be designed such that the maximum bending stress does not exceed the yield strength of the beam material.

In some embodiments, the force required to bend the bending beams of the chamfer former away from the blade is provided entirely by the interaction if the lobes of the chamfer former with the hard stops. When materials having a high yield strength and plastic modulus are chamfered and cut, the force required to press the chamfer former into the material may exceed the electromagnetic force coupling the hold/release arm to the electromagnet. Then, the blade may begin moving downward relative to the chamfer former before the lobes of the chamfer former encounter the hard stops. In such embodiments, the force required to press the wider portion of the blade between the opposing faces of the chamfer former will increase with an increase in both the coefficient of friction between the blade and the opposing faces of the chamfer former, and the bending stiffness of the bending beams. Thus, in some embodiments, it may be useful to design the bending beams to accommodate such applications without exceeding the maximum available actuator force.

Generally, cutting devices of the present disclosure may be used with any dispensing apparatus. A side view of an exemplary dispensing apparatus incorporating a cutting device according to some embodiments of the present disclosure is illustrated in FIG. 5.

Dispensing apparatus 400 includes frame 480, which includes base 460 and side wall 465. Dispensing apparatus also include holder 490 for supporting continuous roll 421 of material 420. Material 420 may be unwound and advanced through the dispensing apparatus and under cutting device 500 through any known means including caterpullers 495. The caterpullers are driven such the surface speeds of the belts are substantially equal when in contact with material 420.

Figure 5:
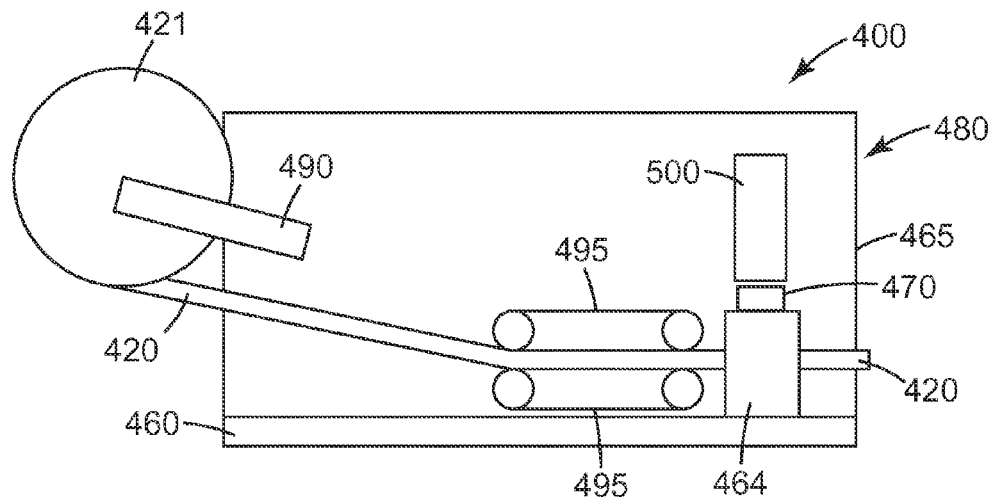
FIG. 5 is a side view of a dispenser according to some embodiments of the present disclosure.
Figure 6:
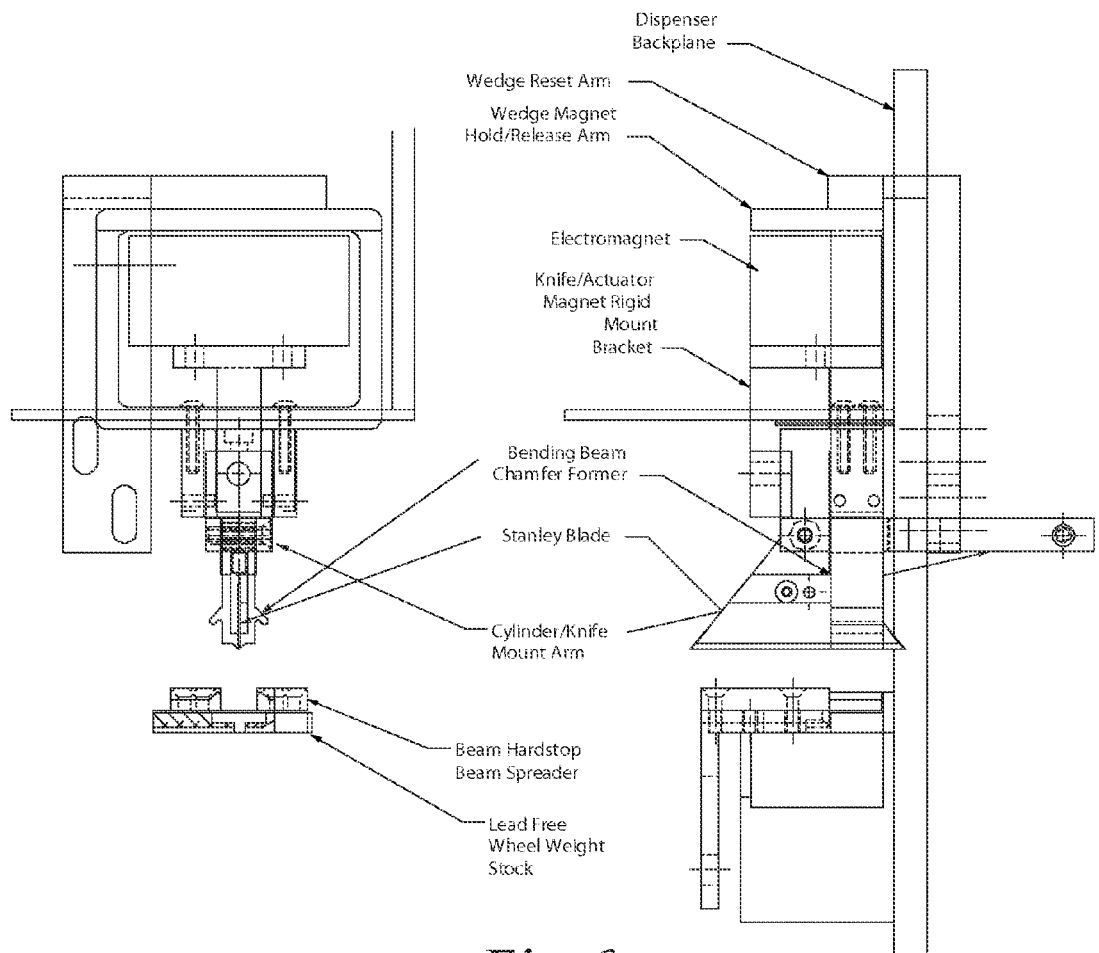
FIG. 6 is a schematic illustration of a side and front view of a cutting device according to some embodiments of the present invention.

A front view of dispensing apparatus 400 is shown in FIG. 5. Side guides 464 extend from or are mounted to base 460. Side guides 464 inhibit sidewise motion of material 20 as it passes under cutting device 500. Hard stops 470 are mounted to side guides 464 such that material 420 passes below them as it is directed between the side guides.

Dispensing apparatus may include any of various additional features known in the art such as controllers to control, e.g., the speed of the caterpullers, the force delivered by the actuator, and the electromagnetic force between the electromagnet and the hold/release arm. Additional features may include safety shields and shut-offs.

What is claimed is:

1. A chamfer cutting device comprising
   a mounting bracket,
   an electromagnet rigidly attached to the mounting bracket,
   a hold/release arm magnetically coupled to the electromagnet,
   a chamfer former rigidly attached to the hold/release arm, wherein the chamfer former comprises two bending beams, each terminating in a chamfer point, and
   a blade rigidly connected to the mounting bracket and positioned between the chamfer points, and further wherein the mounting bracket comprises an actuator arm, an electromagnet support, and a blade holder; wherein one end of the actuator arm is rigidly connected to the blade holder and an end of the actuator arm opposite of the end that is rigidly connected to the blade holder is rigidly connected to an actuator; and wherein the electromagnet is rigidly connected to the electromagnet support, which is rigidly connected to the blade holder.

2. The chamfer cutting device of claim 1, wherein the chamfer former further comprises two lobes, one lobe extending from each bending beam away from the chamfer points.

3. A dispenser comprising a frame having a base and a wall, and a chamfer cutting device mounted to the frame, wherein the chamfer cutting device comprises:
   a mounting bracket,
   an electromagnet rigidly attached to the mounting bracket,
   a hold/release arm magnetically coupled to the electromagnet,
   a chamfer former rigidly attached to the hold/release arm, wherein the chamfer former comprises two bending beams, each terminating in a chamfer point, and
   a blade rigidly connected to the mounting bracket and positioned between the chamfer points, and further wherein the mounting bracket comprises an actuator arm, an electromagnet support, and a blade holder; wherein one end of the actuator arm is rigidly connected to the blade holder and an end of the actuator arm opposite of the end that is rigidly connected to the blade holder is rigidly connected to an actuator; and wherein the electromagnet is rigidly connected to the electromagnet support, which is rigidly connected to the blade holder.

4. The dispenser of claim 3, wherein the frame further comprises a pair of side guides positioned below the blade of the chamfer cutting device and a pair of hard stops attached to tops of the side guides suspended above the base creating a path for material to pass below the hard stops and between the side guides.

* * * * *